United States Patent [19]

Nilsson

[11] Patent Number: 5,029,974
[45] Date of Patent: Jul. 9, 1991

[54] UNITUBE OPTICAL FIBER CABLE

[75] Inventor: Richard C. Nilsson, Hickory, N.C.

[73] Assignee: Alcatel NA Cable Systems, Inc., Claremont, N.C.

[21] Appl. No.: 468,470

[22] Filed: Jan. 22, 1990

[51] Int. Cl.⁵ .................................................. G02B 6/44
[52] U.S. Cl. ............................................. 350/96.23
[58] Field of Search ..................................... 350/96.23

[56] References Cited

U.S. PATENT DOCUMENTS

| | | | |
|---|---|---|---|
| 4,037,922 | 7/1977 | Claypoole | 350/96.23 |
| 4,038,489 | 7/1977 | Stenson et al. | 174/70 R |
| 4,078,853 | 3/1978 | Kempf et al. | 350/96.23 |
| 4,100,008 | 7/1978 | Claypoole | 156/180 |
| 4,153,332 | 5/1979 | Longoni | 350/96.23 |
| 4,318,588 | 3/1982 | Zeidler et al. | 350/96.23 |
| 4,330,173 | 5/1982 | Oestreich | 350/96.23 |
| 4,342,500 | 8/1982 | Oestreich et al. | 350/96.23 |
| 4,370,023 | 1/1983 | Lange et al. | 350/96.23 |
| 4,641,916 | 2/1987 | Oestreich et al. | 350/96.23 |
| 4,660,926 | 4/1987 | Mayr et al. | 350/96.23 |
| 4,723,831 | 2/1988 | Johnson et al. | 350/96.23 |
| 4,730,894 | 3/1988 | Arroyo | 350/96.23 |
| 4,743,085 | 5/1988 | Jenkins et al. | 350/96.23 |
| 4,744,631 | 5/1988 | Eichenbaum et al. | 350/96.23 |
| 4,765,712 | 8/1988 | Bohannon, Jr. et al. | 350/96.23 |
| 4,770,489 | 9/1988 | Saito et al. | 350/96.23 |
| 4,815,813 | 3/1989 | Arroyo et al. | 350/96.23 |
| 4,818,060 | 4/1989 | Arroyo | 350/96.23 |
| 4,826,278 | 5/1989 | Gartside, III et al. | 350/96.23 |
| 4,830,459 | 5/1989 | Chicken et al. | 350/96.23 |

OTHER PUBLICATIONS

Alcatel Cable Systems Products Sheets on: "Armored and Nonarmored Loose Tube Yarn Reinforced Optical Fiber Cable", Nos. 300.01 and 301.01, Sep. 1988 Alcatel Cable System, Claremont, N.C.
Patel & Reynolds—Lxe—A Fiber Optical Cable Sheath Family W/Enhanced Fiber Access, 1988, pp. 72–78.
AT&T-Lightguide Cable Specification Issue 7, Feb. 1988.

*Primary Examiner*—Frank Gonzalez
*Attorney, Agent, or Firm*—Peter C. Van Der Sluys

[57] ABSTRACT

The optical fiber cable has a plurality of centrally located optical fibers. Carrying the optical fibers is a gel-filled plastic buffer tube. A plurality of radial strength yarn threads extended along the outside of the buffer tube in a contra-helical pattern. In the armored cable embodiment, a strength and protective member in the form of a corrugated steel armor layer may be provided for additional protection against possible rodent damage. The armor is usually coated with a thin layer of plastic material in the form of a water blockable flooding compound. A ripcord is provided to assist in removal of the armor. A final polyethylene outer jacket is provided for additional cable protection. Embedded within the outer jacket is a pair of diametrically opposed, longitudinally extending strength members.

11 Claims, 2 Drawing Sheets

UNITUBE OPTICAL FIBER CABLE

BACKGROUND OF THE INVENTION

1. Field of the Invention

The present invention relates to optical fiber cables and, more particularly, to optical fiber cables having a monotube design.

2. Description of the Prior Art

Optical fiber cables have been used for the past several years to transmit information at high rates and long distances. The transmission medium is composed of hair-thin optical fibers which are protected from external forces by precisely designed and manufactured cable structures. Cable structure families which are currently being used are:

A. Loose Tube: Structure in which several gel filled buffer tubes containing optical fibers are stranded around a central strength member.

B. Slotted Core: Structure in which optical fibers are precisely placed in gel filled channels or slots. The channels are symmetrical and form a helical path along the longitudinal axis of the cable. A strength member is located in center of the cable structure.

C. Monotube: Structure in which all of the optical fibers are in a single, centrally located, gel filled buffer tube.

All of the cable structures listed above also incorporate additional protection which may consist of radially applied strength members, corrugated armor, and plastic sheaths.

Two monotube cable structures are currently being manufactured by AT&T (LXE design) and Siecor (Maxitube design). Cable cross-sectional views of the AT&T LXE design generally indicated by the numeral 10 and Siecor Maxitube design generally indicated by the numeral 30 can be found in FIGS. 1 and 2, respectively.

The AT&T LXE cable 10 consists of a single large plastic, gel filled buffer tube 11 which can contain up to 96 optical fibers 12. The buffer tube 11 is surrounded by water-swellable tape 14 and corrugated armor 16. A ripcord 18 is placed under the corrugated armor 16 to aid in sheath removal. A strip of water-swellable tape 15 is helically wrapped around the corrugated armor. Two steel strength members 20 are located 180 degrees apart outside the corrugated armor 16. The armor 16 and strength members 20 are encapsulated by a high-density polyethylene jacket 22 which bonds to the armor 16 and completes the structure.

The cable 10 has several weaknesses in design, processibility and installation. First, the two steel strength members 20 with outer diameters of 0.063" produce an extremely stiff cable. Secondly, the steel strength members have a tendency to "piston" during installation and termination. The term "pistoning" describes the longitudinal movement of the steel strength members relative to the other cable components. Thirdly, the sheathing process is more complex due to the steel strength members 20 impregnated in the jacket 22. Fourthly, water penetration susceptibility exists between the steel strength members 20 and armor 16, and in areas void of water-swellable tape 15. Finally, the non-metallic AT&T LXE cable design is significantly more expensive to produce than the Siecor Maxitube design.

The Siecor Maxitube cable 30 consists of a single, large, gel filled, dual-layer buffer tube 32 which can contain up to 12 optical fibers 34. The buffer tube 32 is surrounded by radial strength yarns 36 which are impregnated with filling compound. Flooded, corrugated armor 38 is applied over the radial strength yarns 36. A ripcord 40 is placed over the corrugated armor 38 to aid in the removal of the outer jacket 42. A medium-density polyethylene jacket 42 is applied over the armor to complete the structure.

The cable 30 also has a number of drawbacks. First, the buffer tube 32 contains up to 0.6% fiber overlength, which is difficult to process in buffering. Secondly, the cable 30 has the capability of containing only 12 fibers. Thirdly, the buffer tube filling compound has a drip susceptibility at 65° C. due to low viscosity. Fourthly, cable flexibility causes reduced sheave spacing during an aerial installation. Fifthly, the two-layer buffer tube 32 is difficult to process. Finally, taunt mid-span entry of the cable 30 is difficult.

SUMMARY OF THE INVENTION

The present invention is designed to overcome the limitations that are attendant upon the use of the prior art cables described above, and toward this end, it contemplates the provision of a novel optical fiber cable which minimizes the drawbacks of the prior art cables.

The cable of the present invention is provided with a buffer tube which contains between 0.15% and 0.35% fiber over length in the buffer tube whereby a high fiber count (comparable to AT&T LXE) in the buffer tube is possible. High viscosity filling compounds are used which will not drip at temperatures up to 80° C. The single layer polyester (PBT) buffer tube combines high strength, good flexibility, and improved processibility.

It is anticipated that the present invention would be applicable for use in many different types of installations including all types of outdoor installation.

It is an object of the present invention to provide a cable design which reduces the overall diameter and weight thereof as compared to many of the prior art cables to facilitate installation in ducts.

It is another object of the present invention to provide an optical fiber cable with radial strength yarns around the buffer tube to inhibit excessive tube stretch during the sheathing process.

A further object is to provide such a cable which may be readily and economically fabricated and will enjoy a long life in operation.

The invention will be more fully understood when reference is made to the following detailed description taken in conjunction with the accompanying drawings.

DETAILED DESCRIPTION OF THE PREFERRED EMBODIMENT

Figure 1:
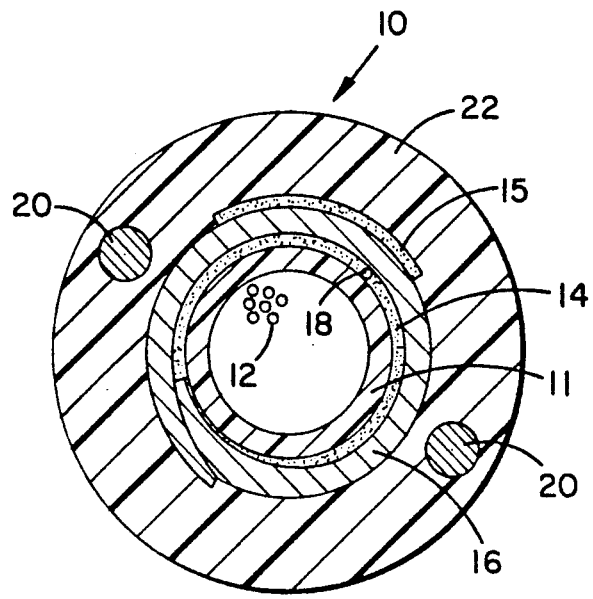
FIG. 1 is a cross-sectional view of the prior art AT&T LXE optical fiber cable design.
Figure 2:
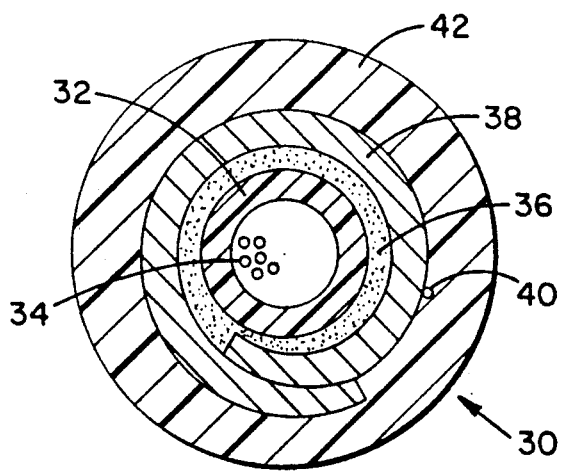
FIG. 2 is a cross-sectional view of the prior art Siecor Maxitube optical fiber cable design.
Figure 3:
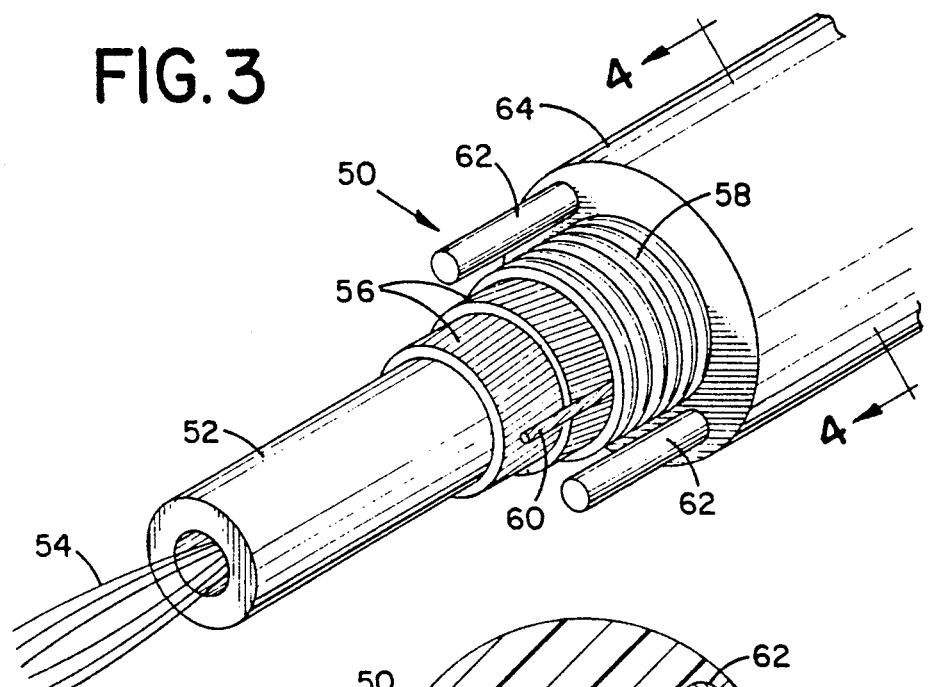
FIG. 3 is a perspective cutaway section of an optical fiber cable made in accordance with the present invention.
Figure 4:
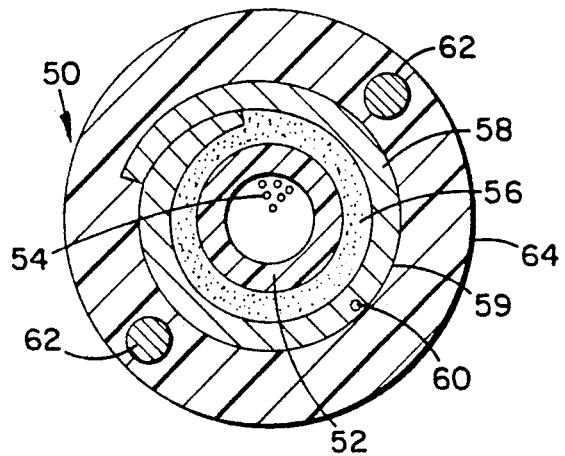
FIG. 4 is a cross-sectional view taken along 4—4 line of FIG. 3.

Turning first to FIGS. 3 and 4, therein is illustrated the armored cable design of the present invention generally indicated by the numeral 50 and having a single, large, gel-filled buffer tube 52 made of polyester (PBT). The gel is a thixotropic, water blockable gel. The gel-filled buffer tube 52 contains a plurality of optical fibers 54. Radial strength yarns 56 made of either aramid or fiberglass materials are contra-helically stranded around the buffer tube 52 and impregnated with filling compound such as a petroleum based hot melt filling compound manufactured by Witco Corporation, New York, N.Y. or Amoco Chemical Company, Chicago. Preferably, at least 50% of the outer surface area of the buffer tube 52 is covered by the radial strength yarns 56. Corrugated steel armor 58 is applied over the radial strength yarns 56. The corrugated armor 58 is flooded with a water blockable flooding compound 59 such as a hot melt adhesive or a petroleum based flooding compound. A high strength ripcord 60 is applied under the armor 59 to aid in sheath removal. Two steel strength members 62, 0.055" in diameter, are located 180 degrees apart on the outside of the corrugated armor 58. A medium-density polyethylene (MDPE) outer jacket 64 encapsulates the steel strength members 62 and corrugated armor 58 to complete the structure. Ideally, the strength cables are at least 0.5 mm from the outer surface of the jacket 64. The water blockable flooding compound 59 is disposed between the corrugated armor 58 and the outer jacket 64.

Figure 5:
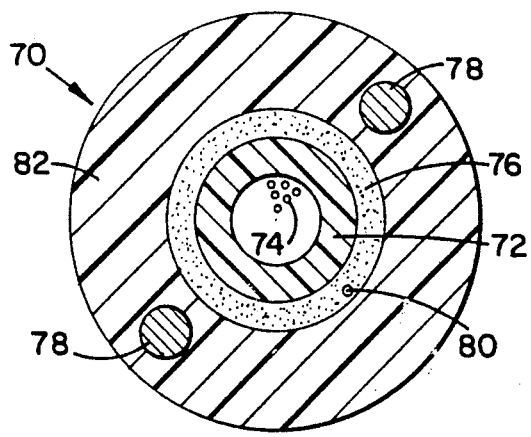
FIG. 5 is a cross-sectional view similar to FIG. 4 but of a second embodiment of the optical fiber cable of the present invention.

The non-armored, cable design of the present invention is shown in FIG. 5 and generally indicated by the numeral 70. It includes a single, large, gel-filled buffer tube 72 made of polyester (PBT). The gel is a thixotropic, water-blockable gel. The gel filled buffer tube 72 contains a plurality of optical fibers 74. Radial strength yarns 76 made of either aramid or fiberglass materials are contra-helically stranded around the buffer tube and impregnated with filling compound such as a petroleum based hot melt filling compound manufactured by Witco Corporation, New York, N.Y. or Amoco Chemical Company, Chicago. Preferably, at least 50% of the outer surface area of the buffer tube 72 is covered by the radial strength yarns 76. Two metallic or dielectric strength members 78, 0.055" in diameter, are located 180 degrees apart on the outside of the radial strength yarns 76. A high strength ripcord 80 is applied over the radial strength yarns 76 to aid in sheath removal. A medium-density polyethylene (MDPE) outer jacket 82 encapsulates the strength members 78 and radial strength yarns 76 to complete the structure. Ideally, the strength cables are at least 0.5 mm from the outer surface of the jacket 82.

Both the armored and non-armored design exhibit improved characteristics over the prior art. The buffer tube contains between 0.15% and 0.35% fiber overlength, which facilitates processing of the cable on a consistent basis. With low fiber overlength in the buffer tube, a high optical fiber count (comparable to AT&T LXE) in the buffer tube is possible while high viscosity filling compounds can be used which will not drip at temperatures to 80° C. The single layer polyester (PBT) buffer tube combines high strength with good flexibility.

The cable of the present invention has a smaller diameter and is lighter in weight than the AT&T LXE design, which improves the ease of installation in ducts. The two steel strength members produce a cable which is stiffer than the Siecor Maxitube design, which facilitates aerial installations. The two steel strength members are 75% smaller than those in the AT&T LXE design, which improves flexibility. The radial strength yarns stranded around the buffer tube inhibit excessive tube stretch during the sheathing process. The combination of steel strength members and radial strength yarns help to better distribute installation loads throughout the cable and improve outer jacket "turtlenecking". The amount of radial strength yarns can be increased in the cable design of the present invention to produce a non-metallic cable which is less expensive than the AT&T LXE non-metallic design.

The core filling and flooding compounds used in the cable design of the present invention to give better, less expensive water penetration resistance over water-swellable tape. The medium-density polyethylene outer jacket used in the present design is easier to process, more flexible, and less expensive than high-density polyethylene used in the prior art AT&T LXE cable. Furthermore, the present cable is designed for mid-span entry under taunt conditions since the strength members do not have to be cut to access the optical fibers.

Thus, it can be seen from the foregoing specification and attached drawings that the optical fiber cable of the present invention provides an effective cable design which emphasizes the positive features and minimizes the negative features of the prior art. The cable is ruggedly built and will function adequately for a very long period of time.

The preferred embodiments admirably achieve the objects of the present invention; however, it should be appreciated that departures can be made by those skilled in the art without departing from the spirit and scope of the invention which is limited only by the following claims.

What is claimed is:

1. An optical fiber cable comprised of:
   a single, hollow buffer tube with at least one optical fiber disposed therein;
   contra-helically stranded strength yarns applied over said buffer tube;
   a water blockable filling compound impregnating said strength yarns;
   a plastic jacket which encapsulates said buffer tube and said filling compound impregnated strength yarns;
   two strength members longitudinally embedded near the inner surface of said jacket approximately 180 degrees apart.

2. A cable as described in claim 1, wherein a metallic shield is disposed between said strength yarns and said jacket.

3. A cable as described in claim 2, wherein said metallic shield is corrugated.

4. A cable as described in claim 3, wherein a water blockable flooding compound is disposed between said metallic shield and said jacket.

5. A cable as described in claim 1, wherein said optical fiber has a longitudinal length at least 0.15% longer than said buffer tube longitudinal length.

6. A cable as described in claim 1, wherein the distance between said strength members and the outer surface of said jacket is at least 0.5 mm.

7. A cable as described in claim 1, wherein said strength yarns cover at least 50% of the outer surface area of said buffer tube.

8. A cable as described in claim 1, further including a ripcord longitudinally disposed over said strength yarns.

9. A cable as described in claim 8 wherein said ripcord is positioned approximately 90 degrees from said strength members.

10. A cable as described in claim 1, wherein said strength members are metallic.

11. A cable as described in claim 1, wherein said strength members are non-metallic.

* * * * *